US009720896B1

(12) United States Patent
Wu et al.

(10) Patent No.: US 9,720,896 B1
(45) Date of Patent: Aug. 1, 2017

(54) SYNTHESIZING UNION TABLES FROM THE WEB (71) Applicant: Google Inc., Mountain View, CA (US)

(72) Inventors: Fei Wu, Seattle, WA (US); Cong Yu, Hoboken, NJ (US); Alon Yitzchak Halevy, Los Altos, CA (US); Xiao Ling, Belmont, CA (US)

(73) Assignee: Google Inc., Mountain View, CA (US)

( * ) Notice: Subject to any disclaimer, the term of this patent is extended or adjusted under 35 U.S.C. 154(b) by 569 days.

(21) Appl. No.: 14/143,032

(22) Filed: Dec. 30, 2013

(51) Int. Cl.
*G06F 17/21* (2006.01)
*G06F 17/24* (2006.01)
*G06F 17/22* (2006.01)

(52) U.S. Cl.
CPC ........ *G06F 17/245* (2013.01); *G06F 17/2247* (2013.01)

(58) Field of Classification Search
CPC ............. G06F 17/30498; G06F 17/248; G06F 17/246; G06F 17/30466; G06F 17/30592; G06F 17/30861; G06F 17/30864; G06F 17/30896; G06F 17/245; G06F 17/2247
See application file for complete search history.

(56) References Cited

U.S. PATENT DOCUMENTS

| | | | | |
|---|---|---|---|---|
| 6,738,767 B1* | 5/2004 | Chung | ............... | G06F 17/30864 |
| 6,957,225 B1* | 10/2005 | Zait | ..................... | G06F 17/3033 |
| 6,999,967 B1* | 2/2006 | Ghazal | .............. | G06F 17/30498 |
| 8,117,203 B2* | 2/2012 | Gazen | ............... | G06F 17/30861 |
| | | | | 707/737 |
| 9,165,040 B1* | 10/2015 | Hajaj | ................... | G06F 17/3053 |
| 2005/0251805 A1* | 11/2005 | Bamba | .............. | G06F 17/30882 |
| | | | | 718/100 |
| 2006/0224565 A1* | 10/2006 | Ashutosh | .......... | G06F 17/30864 |
| 2006/0235834 A1* | 10/2006 | Blakeley | ........... | G06F 17/30466 |
| 2010/0169758 A1* | 7/2010 | Thomsen | .............. | G06F 17/246 |
| | | | | 715/212 |
| 2012/0011115 A1* | 1/2012 | Madhavan | ........ | G06F 17/30864 |
| | | | | 707/723 |

OTHER PUBLICATIONS

Sarma et al., "Finding Related Tables," SIGMOD '12 Proceedings of the 2012 ACM SIGMOD International Conference on Management of Data, pp. 817-828, 2012.

* cited by examiner

*Primary Examiner* — Wilson Tsui
(74) *Attorney, Agent, or Firm* — Fish & Richardson P.C.

(57) ABSTRACT

Systems and techniques are provided for generating a union table with from stitchable tables. Tables may be extracted from web pages to obtain extracted tables. Stitchable tables may be determined from the extracted tables. Hidden attributes for the stitchable tables may be extracted from the web pages from which the stitchable tables were extracted using segmentation of text for contextual data from the web pages into segment sequences, and alignment of the segment sequences. Iterative pairwise alignment may be used to align the segment sequences and obtain aligned segments. The stitchable tables may be joined into a union table. Hidden attributes from the aligned segments may be added to the union table. Headers for the hidden attributes in the union table may be labeled using a database of entities and class labels.

20 Claims, 5 Drawing Sheets

| Town | School | Number of Students | Grades |
|---|---|---|---|
| Bentonville | Bentonville High School | 3333 | 9-12 |
| Decatur | Decatur High School | 120 | 9-12 |
| Gentry | Gentry High School | 417 | 9-12 |
| Gravette | Gravette High School | 526 | 9-12 |

215
225

250

| Town | School | Grades | # of Students |
|---|---|---|---|
| Adams | Berkshire Charter School | 6-12 | 216 |
| Cheshire | Hoosac Valley High School | 7-12 | 692 |
| Dalton | Wahconah Regional High School | 9-12 | 628 |

| Town | School | Number of Students | Grades | State | County |
|---|---|---|---|---|---|
| Bentonville | Bentonville High School | 3333 | 9-12 | Arkansas | Benton County |
| Decatur | Decatur High School | 120 | 9-12 | Arkansas | Benton County |
| Gentry | Gentry High School | 417 | 9-12 | Arkansas | Benton County |
| Gravette | Gravette High School | 526 | 9-12 | Arkansas | Benton County |
| Adams | Berkshire Charter School | 216 | 6-12 | Massachusetts | Berkshire County |
| Cheshire | Hoosac Valley High Schol | 692 | 7-12 | Massachusetts | Berkshire County |
| Dalton | Wahconah Regional High School | 628 | 9-12 | Massachusetts | Berkshire County |

FIG. 7

Determine Stitchable Tables
700

→

Extract Hidden Attributes for Stitchable Tables
702

→

Join Stitchable Tables and Add Hidden Attributes into Union Table
704

SYNTHESIZING UNION TABLES FROM THE WEB

BACKGROUND

Tables that appear on web pages may be an important source of structured data. Several approaches may be used to extract tables from the web pages where they appear, harvesting raw HTML tables or lists from the Web and recovering their semantics. These approaches may typically focus on semantically annotating the tables for other uses, such as data visualization, search, and enriching knowledge bases.

A table may be fragmented, for example, with a single table broken up across several web pages. This may make utilizing the data in the tables after extraction more difficult, as extraction may create an individual table for each table fragment. To run a query against the fragmented table, the query may need to be run against each of the individual tables created by extracting the table fragments.

In some instances, tables spread across various web pages may be related. The tables may include similar data types, and may be parts of a fragmented table. Simply joining such tables together, even when they are related, may lead to a table that contains confusing and inconsistent data. Without knowing the context of the tables, it may be difficult to determine if related tables can be joined together to produce a consistent table.

BRIEF SUMMARY

According to an embodiment of the disclosed subject matter, two or more tables extracted from one or more web pages may be received. Two or more stitchable tables may be determined to be included in the two or more tables. A hidden attribute associated with two or more stitchable tables may be extracted. The two or more stitchable tables may be joined into a union table, wherein the union table includes the two or more stitchable tables and the hidden attribute. The hidden attribute for one of the two or more stitchable tables may be extracted from a web page from which the stitchable table was extracted.

A semantic equivalence may be determined between headers from a first table and a second table. Each header from the first table may be determined to be semantically equivalent to exactly one header from the second table. Each header from the second table may be determined to be semantically equivalent to exactly one header in the first table. A header from the first table may be semantically equivalent to a header from the second table when the header from the first table and the header from the second table are synonyms, acronyms, or semantic-preserving variations.

Hidden attributes may be extracted by segmenting text associated with the one or more web pages from which stitchable tables were extracted to obtain two or more segment sequences. Possible segment alignments between the segment sequences may be scored. Segments may be aligned between the two segment sequences based on the scoring of the possible segment alignments to create aligned segments. Possible segment alignments may be scored using iterative pairwise alignment on the segment sequences.

The text may be segmented using a heuristic including punctuation, html-tag separators, longest common subsequences, and linking text to an entity repository. The possible segment alignments may be scored based on the heuristic used to generate the segments.

Aligned segments may be discarded from the segment sequences when the aligned segments have the same value and the value is not found in a corpus of meaningful table headers.

A class label may be determined for a hidden attribute. The class label may be added to the union table to label the hidden attribute. An entity in a database that corresponds to a value type for the hidden attribute may be determined, where the class label for the hidden attribute is a class label associated with the entity in the database.

According to an embodiment of the disclosed subject matter, a means for receiving two or more tables extracted from at least one web page, a means for determining the two or more tables include two or more stitchable tables, a means for extracting a hidden attribute associated with the two or more stitchable tables, and a means for joining the two or more stitchable tables to obtain a union table, where the union table includes the two or more stitchable tables and the hidden attribute, are included.

A means for determining a semantic equivalence between headers from a first of the two or more tables and headers from a second of the two or more tables, a means for determining that each header from a first table of the two or more tables is semantically equivalent to exactly one header from the second table, a means for determining that each header from a second table of the two or more tables is semantically equivalent to exactly one header in the first table, a means for segmenting text associated with the a web page from which a stitchable table was extracted to obtain at least two segment sequences, a means for scoring possible segment alignments between the at least two segment sequences, a means for aligning segments between the at least two segment sequences based on the scoring of the possible segment alignments to obtain aligned segments, a means for scoring possible segment alignments and aligning segments includes performing iterative pairwise alignment on the at least two segment sequences, a means for discarding aligned segments from the at least two segment sequences when the aligned segments have the same value and the value is not found in a corpus of meaningful table headers, a means for determining a class label for the a hidden attribute, and a means for adding the class label to the union table to label the a hidden attribute, are also included.

Systems and techniques disclosed herein may allow for harvesting semantic data and/or stitching together disparate tables, or separated portions of a single table. Data may be recovered from web-based tables for use in other contexts, and semantically-related data may be combined for more efficient use. Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 1 shows an example system suitable for joining stitchable tables according to an implementation of the disclosed subject matter.

DETAILED DESCRIPTION

Joining related tables extracted from web pages may allow for the creation of more comprehensive tables, which may allow the structured data in the created table to be more useful than if the data were spread across several separate tables. In an implementation of the disclosed subject matter, tables extracted from web pages may be examined to determine if any of the tables are stitchable to one another. For example, a web site may include a number of tables that appear on different web pages on the web site. The tables may be related to one another, for example, by being fragments of a larger table, or because they include semantically-related data that is spread across the tables. Tables that are stitchable to one another may be stitchable tables in a group of stitchable tables. Being a stitchable table in a group of stitchable tables may be transitive. For example, if a first table and a second table are stitchable tables, in that they are stitchable to one another, and the second table and a third table are stitchable tables, then the first table and the third table may also be stitchable tables, and the first, second and third tables may be stitchable tables in a group of stitchable tables.

Whether any of the extracted tables are stitchable tables may be determined based on the characteristics of the tables, such as, for example, table headers. For example, the headers from the extracted tables may be examined to determine if there is a correspondence between the headers. If the headers from a first table are exactly the same as the headers from a second table, the first and second table may be stitchable tables. If the headers are not exactly the same, the tables may still be stitchable tables if there is a semantic equivalence between the headers. For example, if for every header in the first table there is one, and only one, semantically equivalent header in the second table, and for every header in the second table there is one, and only one, semantically equivalent header in the first table, regardless of the ordering of the headers, the first table and the second table may be stitchable tables in a group of stitchable tables. Headers may be semantically equivalent when the headers are, for example, synonyms, or other semantic-preserving variations of each other. For example, a header that is "Date of Birth" may be semantically equivalent to a header that is "D.O.B."

Tables that are determined to be stitchable tables in a group of stitchable tables may be joined together into a single union table. A group of stitchable tables may have any number of stitchable tables which may be merged to create a union table. The union table may include all of the data from all of the joined stitchable tables. For example, if a table including data for schools in a first school district and a table including data for schools in a second school district are stitchable tables, the union table may include data for the schools in both the first and second school district.

Hidden attributes for the tables may be extracted from the web pages from which the tables were extracted. The hidden attributes may be contextual data that can be used to make a table more informative, or to help disambiguate data in a union table. For example, a table including data for schools in a first school district may not include the name of the school district. Instead, the name of the school district may be included as part of the web page from which the table was extracted, for example, as text on the web page, the title of the web page, in the page URL, in HTML caption tags, or the like. If the table including data for schools in a first school district is merged with a table including data for schools in a second school district without knowing the names of the school districts, the resulting union table may be confusing or ambiguous. There may be, for example, shared names between schools in the first and second school district, and no way to ascertain which school is in which school district from the union table. By extracting the hidden attribute of the name of the school district from the web pages from which the tables were extracted, and adding the hidden attribute to the union table, data on the table may be disambiguated. The hidden attributes may also provide additional information about data in the union table even when disambiguation is not needed. For example, contextual data on a first web page may indicate that a table on the first web page lists only public schools, while contextual data on a second web page may indicate that a table on the second web page lists only private schools. When the table from the first web page is joined with the table from the second web page, it may also be useful to add data about whether each school in the resulting union table is public or private. This may be accomplished by extracting the hidden attribute of school type from the first and second web pages and adding the hidden attribute to the union table.

In order to be added to a union table for stitchable tables, hidden attributes may need to be shared between the web pages for the stitchable tables. For example, the name of the school district may need to be extracted from the web page for the first table and the web page for the second table, so that a column header for the school district name can be added to the union table. A hidden attribute that is extracted for one stitchable table, but not for other stitchable tables, may not be useful to add to the union table.

The hidden attributes may be extracted from web pages using, for example, segmentation and alignment. The text associated with a web page, including, as described above, text on the web page, titles, URL's, and HTML, may be segmented. Segmenting may be based on any suitable heuristics, such as, for example, punctuation and html tag separators, a longest common subsequence of text or markup tags, or by linking the text to an entity repository. Using punctuation and html tag-based segmenting, segments may be separated by punctuation used to indicate separate, such as periods, commas, colons, and vertical bars, or by html-tags indicating a change in font type, color, size, or any other suitable stylistic feature of the text. For example, if a portion of the text has a font color of red, and a subsequent portion has a font color of black, the red portion may be a first segment and the black portion may be a second segment. Longest common subsequence segmentation may detect common segments in the text of the web pages, and use these common segments to separate contextual text. For example, identical sequences of tokens in a set of web pages being considered may be identified, and the longest sequences used as separators. Generally, the tokens may be characters, words, HTML tags, or various combinations thereof. Any remaining segments, which may have different content across sequences, may be extracted as hidden attributes. The text on the web pages may also be linked to an entity repository, such as, for example, an online database, knowledge graph, or encyclopedia. When text, such as text including place names or other proper nouns can be linked to an entity repository, it may indicate that text includes a hidden attribute for the table extracted from the web page. Segmentation may produce a segment sequence for the web page.

After the text associated with web pages from which the stitchable tables were extracted has been segmented, the sequences for the web pages may be aligned to determine if any of the segments include hidden attributes for the stitchable tables. Alignment may be accomplished using, for example, segment matching scores. The segment matching scores for segments from separate sequences may be calculated based on the heuristic used to create the segments during segmentation, whether or not the segments are empty, and the segment matching score for preceding segments. The segment matching scores may be calculated between all pairs of segments in the sequences, and used to extract the highest scoring alignment of the segments in the sequences. When more than two sequences are being aligned, for example, when there are three or more stitchable tables in the group of stitchable tables, iterative pairwise alignment may be used to reduce the computational complexity of aligning the segment sequences, as described in further detail herein.

Once an alignment for the sequences of segments has been determined, the hidden attributes may be extracted from the aligned segments. The hidden attributes may be filtered by, for example, discarding hidden attributes from aligned segments where all of the segments have the same value and where the value is not considered meaningful. Whether a value is meaningful may be based on cross-referencing the value for the hidden attribute with a database of the frequency of attribute column name in a table corpus. When all of the segments for a hidden attribute have the same value, the value may be checked against the table corpus to determine if the value is an attribute name itself. If the value is not an attribute name, that aligned segment may be discarded and may not be used as a hidden attribute.

The hidden attributes extracted from the aligned segments that are not discarded may be added to the union table. For example, a column may be added to the union table for each hidden attribute. The column for one of the hidden attributes may be given a header by, for example, looking up the value type of the hidden attribute in a class label database. The class label database may be a database of entities and associated class labels gathered in any suitable manner, such as, for example, from the web. A corresponding entity in the class label database may be found for the value type of the hidden attribute, and the class label associated with the corresponding entity may be used as the header label for the hidden attribute in the union table. For example, if the aligned segments are all names of cities, the city names may be located in the class label database. The entities in the class label database that are city names may be associated with the class label "city name," which may then be used as the header in the union table for the hidden attribute.

Figure 1:
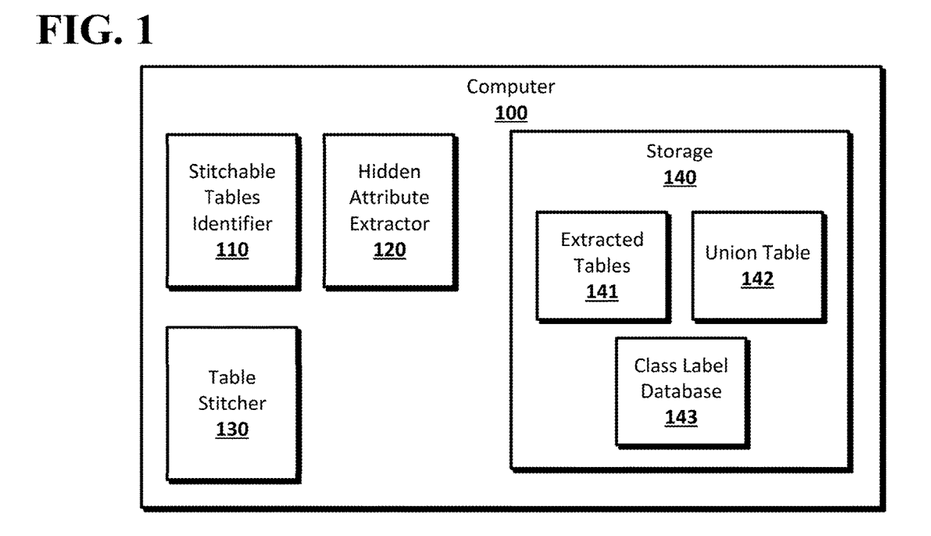

FIG. 1 shows an example system suitable for joining stitchable tables according to an implementation of the disclosed subject matter. A computer 100 may include a stitchable table identifier 110, a hidden attribute extractor 120, a table stitcher 130, and storage 140. The computer 100 may be any suitable device, such as, for example, a computer 20 as described in FIG. 9, for implementing the stitchable table identifier 110, the hidden attribute extractor 120, the table stitcher 130, and storage 140. The computer 100 may be a single computing device, or may include multiple connected computing devices. The stitchable table identifier 110 may identify and group stitchable tables from extracted tables 141. The hidden attribute extractor 120 may extract hidden attributes for the stitchable tables identified by the stitchable table identifier 110 from web pages from which the stitchable tables were extracted. The table stitcher 130 may merge the stitchable tables in a group of stitchable tables identified by the stitchable tables identifier 110 and add the hidden attributes extracted by the hidden attribute extractor 120 to generate a union table 142. The database 140 may store the extracted tables 141 and the union table 142, and a class label database 143.

Figure 2:
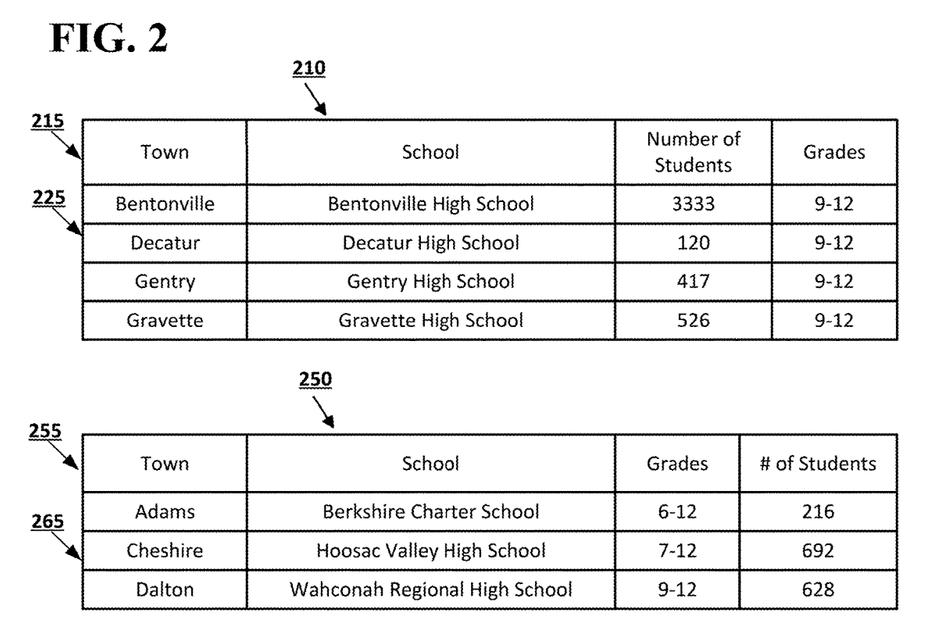
FIG. 2 shows an example of two extracted tables according to an implementation of the disclosed subject matter.

FIG. 2 shows an example of two extracted tables according to an implementation of the disclosed subject matter. Tables in the extracted tables 141 may be extracted from web pages by, for example harvesting raw HTML tables or lists from the HTML source of the web pages. Other information about the tables may also be stored in the extracted tables 141, such as, for example, URLs for web page from which the tables were extracted. Tables 210 and 250 may be tables extracted from web pages and stored with the extracted tables 141. The table 210 may include headers 215, and the table 250 may include headers 255. The headers 215 and 255 may include a label for each column in the tables 210 and 250 that describes the data included in the column. For example, the headers 215 in the table 210 indicate that the first column includes a town name, the second column includes a school name, the third column includes the number of students in the school, and the fourth column includes grade levels of the students in the school. Each row in the table 210 may be an entry 225, and each row in the table 250 may be an entry 265. The entries 225 and 265 may include data values of the type indicated by the headers 215 and 255, and may be, for example, tuples. For example, in the table 210, one of the entries 225 may include a data value of "Decatur" corresponding to the town name header, a data value of "Decatur High School" corresponding to the school name header, a data value of "120" corresponding to the number of students header, and a data value of "9-12" corresponding to the grades header.

To determine if tables in the extracted tables 141 are stitchable tables, headers for the tables may be compared for semantic equivalence by, for example, the stitchable tables identifier 110. Two tables may be stitchable tables in a group of stitchable tables when there is exactly one semantically equivalent header in each table for each header in the other table, regardless of header ordering. This may require tables to have the same number of headers in order to be stitchable tables in a group of stitchable tables. Semantic equivalence between headers may be established using any suitable criteria, such as, for example, whether the headers are synonyms, acronyms, or semantics-preserving variations of each other.

The table 210 and the table 250 may be stitchable tables in one group of stitchable tables. The first header 215 from the table 210 may be "town", indicating the column includes a town name. This may be semantically equivalent to the first header 255 from the table 250, which may also be "town." The second header 215 from the table 210 may be "school", indicating the column includes a school name. This may be semantically equivalent to the second header 255 from the table 250, which may also be "school." The third header 215 from the table 210 may be "number of students", indicating the column includes the number of students in the school listed under the "school" header. This may be semantically equivalent to the fourth header 255 from the table 250, which may be "# of students," because "# of students" is a semantics-preserving variation of "number of students." The fourth header 215 from the table 210 may be "grades", indicating the column includes the grades of students in the school. This may be semantically equivalent to the third header 255 from the table 250, which may also be "grades." Each header 215 from the table 210 may thus have exactly one semantically equivalent header 255 in the table 250, and each header 255 in the table 250 may have exactly one semantically equivalent header 215 in the table 210.

There may be multiple groups of stitchable tables within the extracted tables 141. For example, the extracted tables 141 may include 10 tables. A first, second, and third table may be stitchable to each other, and form one group of stitchable tables. A fourth, fifth, sixth, and seventh table may be stitchable to each other, and form a second group of stitchable tables. A eighth, ninth, and tenth table may be stitchable to each other, and form a third group of stitchable tables. The stitchable tables identifier 110 may be used to determine all groups of stitchable tables from the tables in the extracted tables 141.

Figure 3:
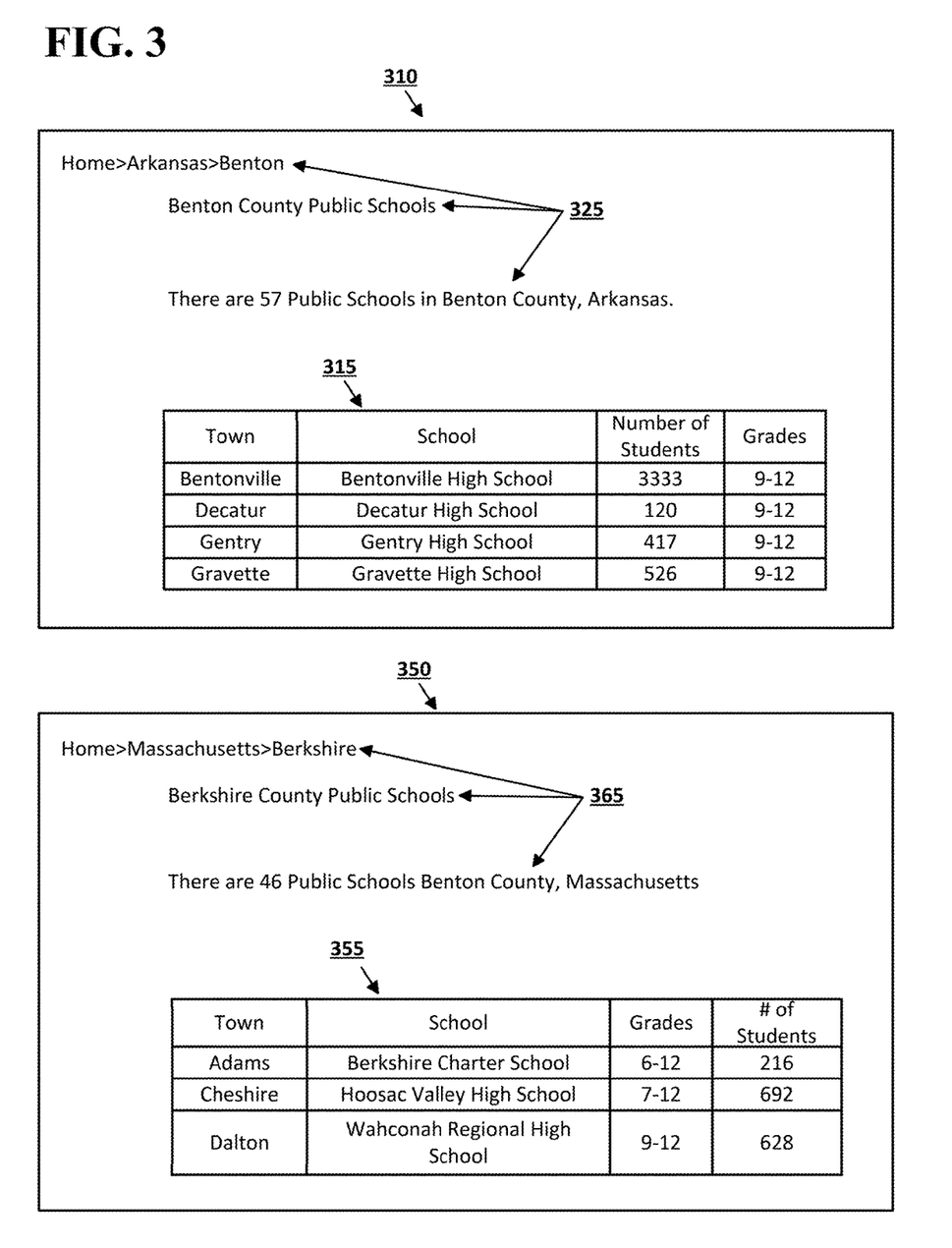
FIG. 3 shows an example of two web pages with tables according to an implementation of the disclosed subject matter

FIG. 3 shows an example of two web pages with tables according to an implementation of the disclosed subject matter. The tables in the extracted tables 141 may have been extracted from web pages, which may be, for example, web pages that are publicly available over the internet. For example, the tables 210 and 250 may be extracted from web pages 310 and 350. The web pages 310 and 350 may be web pages that can be viewed by a user using any suitable software and hardware. The tables 315 and 355 may be tables that are displayed on the web pages 310 and 350. The tables 210 and 250 may be tables created by extracting the tables 315 and 355 from the web pages 310 and 350 by, for example, harvesting the raw HTML that includes the data in the tables 315 and 350 from the HTML source for the web pages 310 and 350.

The web pages 310 and 350 may include contextual data which may provide further information about the tables 315 and 355. The contextual data may be any text associated with the web pages 310 and 350, such as, for example, displayed text 325 and 365, URLs, HTML source and comments, and the titles of the web pages 310 and 350. The contextual data from the web pages 310 and 350 may be used to extract hidden attributes that can be added to the union table 142 that results when the tables extracted from the tables 315 and 355, the tables 210 and 250, which may stitchable tables, are joined.

Figure 4:
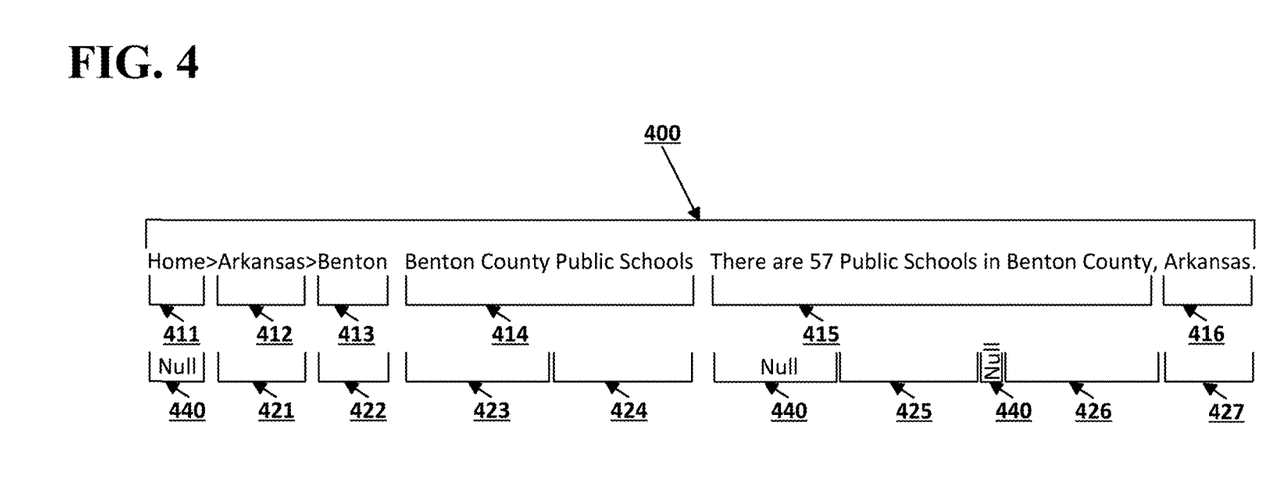
FIG. 4 shows an example of segmented text according to an implementation of the disclosed subject matter.

FIG. 4 shows an example of segmented text according to an implementation of the disclosed subject matter. The hidden attributes may be extracted from the web pages 310 and 350 by, for example, segmentation and alignment performed by, for example, the hidden attribute extractor 120. The text for the contextual data from the web pages 310 and 350 may be segmented using heuristics, such as, for example, punctuation and html tag separators, longest common subsequence, or by linking the text to an entity repository. The text for the contextual data may be divided into tokens, where each token is, for example, a single word. Any suitable segmenting heuristic may be applied to the tokens to produce a segment sequence. Multiple segmenting heuristics may be applied to the same set of tokens, which may result in some of the segments in the segment sequence having overlapping tokens.

For example, the displayed text 325 may be divided into tokens 410. The tokens 410 may then be segmented by, for example, linking the text to an entity repository and segmenting by punctuation and html tag separators to produce a segment sequence. The segment sequence may include segments 411, 412, 413, 414, 415, and 416 produced through segmentation by punctuation and html tag separators, and segments 421, 422, 423, 424, 425, 426, and 427, produced by linking text to an entity repository. For example, segment 415 may include the tokens 410 between an end-of-line html tag and a comma, and segment 426 may be the result of linking the tokens 410 for "Benton County" to an entry for Benton County in an entity repository such as, for example, an online database. Null segments 440 may be empty or null segments used to maintain alignment between different heuristics, for example, when a heuristic wouldn't otherwise segment part of the text. For example, the heuristic linking the text to an entity repository may not create a segment for the phrase "There are 57". The null segment 440 may be used to segment the phrase. The segments 411, 412, 413, 414, 415, 416, 421, 422, 423, 424, 425, 426, and 427 may be candidate segments for alignment when attempting to extract hidden attributes from the web page 310.

In some instances, more than one table may be extracted from the same web page. For example, if the tables 315 and 355 were both displayed on the web page 310, then the tables 210 and 250 would have been extracted from the same web page 310. In this case, the text for the contextual data for the table 210 may be the text closest to the table 315 in a document-object-model of the web page 310, and the text for the contextual data for the table 250 may be the text closest to the table 355 in a document-object-model of the web page 310.

Figure 5:
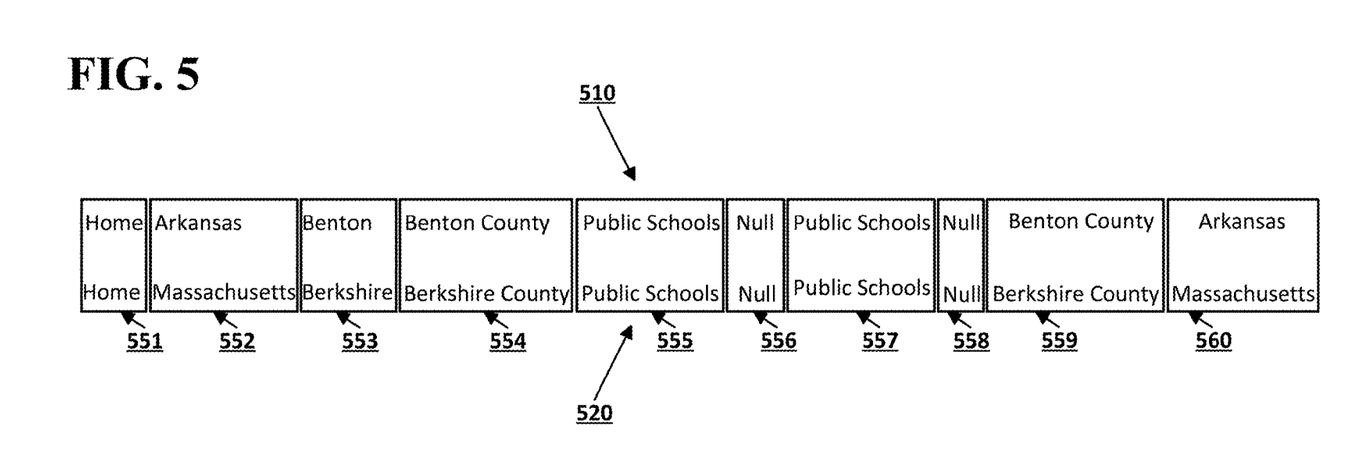
FIG. 5 shows an example of aligned segments according to an implementation of the disclosed subject matter.

FIG. 5 shows an example of aligned segment text according to an implementation of the disclosed subject matter. After the text for the contextual data from a web page from which a stitchable table was extracted has been segmented by, for example, the hidden attribute extractor 120, the segment sequences may be aligned. For example, the segment sequence 510, created by segmenting the text associated with the web page 310, may be aligned with the segment sequence 520, created by segmenting the text associated with the web page 350. Segment sequences may be aligned in any suitable manner. For example, if there are two stitchable tables, such as the tables 210 and 250, and two segment sequences, such as the segment sequences 510 and 520, extracted from the web pages 310 and 350, the segment sequences 510 and 520 may be aligned by pairwise segment alignment of the segment sequences 510 and 520.

Pairwise alignment on two segment sequences may be performed by, for example, creating a chart C of size $(n_1+1)*(n_2+1)$, where $n_1$ is the number of tokens in a set of tokens $T_1$, and $n_2$ is a number of tokens in a set of tokens $T_2$. $T_1$ and $T_2$ may be the sets of tokens from text for the contextual data from the web pages. The tokens in $T_1$ and $T_2$ may be segmented by any suitable heuristic to produce sets of segments $S_1$ and $S_2$. Each location $C(i,j)$ in the chart C may store a score for the best alignment of the subsequences of $T_1$ between the first and ith token and $T_2$ between the first and jth token and the last aligned segment for each subsequence. For each location (i,j), starting with i=1 and j=1 and iterating over i and j, pairs of segments may be enumerated based on all of the segments in $S_1$ that end at token i in $T_1$ and of the segments in $S_2$ that end at token j in $T_2$. Each of the segment pairs may be given a segment matching score. For example, the segment matching score for a segment pair $(s_1, s_2)$ may be $\lambda_h$ if $s_1$ and $s_2$ are segments that were generated by the same heuristic, $\lambda_{gap}$ if either $s_1$ or $s_2$ is an empty or null segment, for example, the null segment 440, and 0 in all other cases. $\lambda_h$ may have a higher value than $\lambda_{gap}$. The sum of the segment matching score for the segment pair $(s_1, s_2)$ and the best alignment score for the segment pair of the segments that precede $s_1$ and $s_2$ may be used to update $C(i,j)$ if it is greater than another alignment score already stored in $C(i,j)$. The best alignment score for the segment pair of the segments that precede $s_1$ and $s_2$ may be stored at $C(i-|s_1|, j-|s_2|)$, where $|s_1|$ is the number of tokens in segment $s_1$ and $|s_2|$ is the number of tokens in segment $s_2$. Once the chart C has been filled in, the aligned segments may be extracted by backtracking through the chart from the entry $(n_1, n_2)$ through the highest alignment scores.

Alignment of the segment sequences may produce aligned segments, which may include possible values for hidden attributes for the stitchable tables. For example, aligning the segment sequence 510 and the segment sequence 520 may produce aligned segments 551, 552, 553, 554, 555, 556, 557, 558, 559, and 560, which may include values for possible hidden attributes of the tables 210 and 250.

In some instances, there may be more than two stitchable tables, and more than two segment sequences. For example, in addition to the table 210 and the table 250, a third table may be extracted from a third web page, and the third table may be a stitchable table in a group of stitchable tables with the tables 210 and 250. A third segment sequence may then be produced from the text for the contextual data on the third web page. The third segment sequence may be aligned with the segment sequences 510 and 520 to extract hidden attributes for the union table 142 produced by joining the third table with the tables 210 and 250. Performing pairwise alignment to align more than two segment sequences may be computationally intensive. Iterative pairwise alignment may be used when more than two segments are being aligned. In iterative pairwise alignment, pairwise alignment may be performed on any two of the segment sequences being aligned, and additional segment sequences may then be aligned with the already aligned segment sequences one at a time.

For example, pairwise alignment may be performed on the segment sequences 510 and 520. The third segment sequence may then be aligned with the alignment of the already aligned segment sequences 510 and 520 using pairwise alignment with a modified scoring function. For a segment $s_j$ in the third segment sequence, instead of scoring a segment pair of $s_j$ and a segment from one of the segment sequences 510 and 520, a segment matching score may be determined for the segment $s_j$ and a profile slot ps. The profile slot ps may be a set of segment-probability pairs $\{(s_i, p_i)\}$, which may be a distribution of segments from all previously aligned segment sequences for that entry in $C(i,j)$. $p_i$ may be the probability that the segment $s_i$ is the segment that will be in that slot in the best alignment. The segment matching score for (ps, $s_i$) may be the sum of all of the segment matching scores for the segment pairs $(s_i, s_j)$, which may be calculated as in pairwise alignment, multiplied by the probabilities $p_i$ for every segment-probability pair in the profile slot ps. This segment matching score may be used in the same manner as the segment matching score calculated for pairwise alignment. This may be repeated to align any number of additional segment sequences.

The aligned segments 551, 552, 553, 554, 555, 556, 557, 558, 559, and 560 may include possible values for hidden attributes for the union table 142 that will be created by joining the tables 210 and 250. Filtering may be applied to the aligned segments 551, 552, 553, 554, 555, 556, 557, 558, 559, and 560 to remove aligned segments that don't provide additional context to the union table 142. Aligned segments may be filtered out when, for example, all of the values for the segments in the aligned segments are the same, and the value is not meaningful. A value may be determined to be not meaningful if the value does not appear in attribute label database, which may be a corpus of meaningful tables headers built from, for example, a corpus of tables extracted from web pages. A value that does not appear in, for example, the top 5000 most frequent table headers in the attribute label database may not be meaningful. For example, the aligned segments 551 may be filtered out, as both the segments from the segment sequence 510 and the segment sequence 520 have the same value, "Home", which may not be a meaningful table header. Other suitable techniques may be used to filter out aligned segments, for example, filtering out aligned segments where the segments are the null segment 440, such as in aligned segments 556 and 558. Any remaining aligned segments may represent hidden attributes that can be added to the union table 142. For example, the aligned segments 552 and 560 both may represent the state in which the schools listed in the tables 210 and 250 are located, and may be used in the union table 142 to provide additional information about entries in the union table 142. Duplicated aligned segments may be consolidated.

Figure 6:
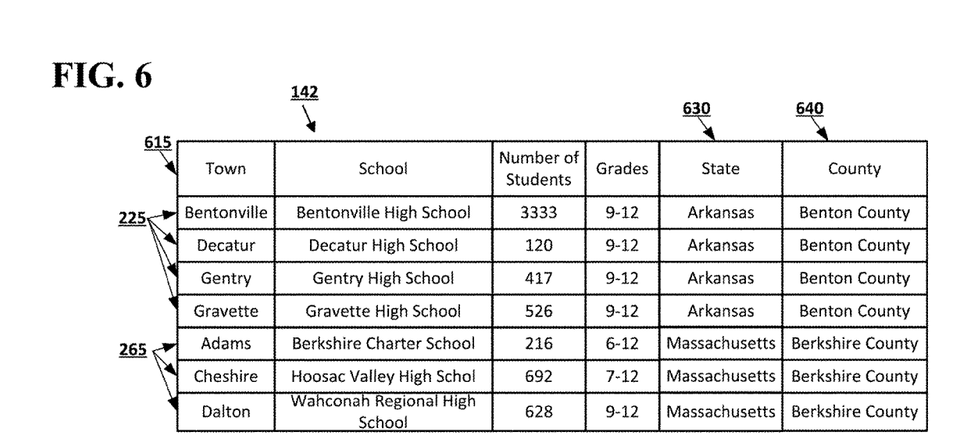
FIG. 6 shows an example of a union table with hidden attributes according to an implementation of the disclosed subject matter.

FIG. 6 shows an example of a union table with hidden attributes according to an implementation of the disclosed subject matter. Once the hidden attributes have been extracted, they may be added to the union table 142. The union table 142 may be created by the table stitcher 130, by joining the stitchable tables in a group of stitchable tables from the extracted tables 141 determined by the stitchable tables identifier 110, and then adding the hidden attributes extracted by the hidden attribute extractor 120. For example, the tables 210 and 250 may have been determined to be stitchable tables in a group of stitchable tables, and may be joined into the union table 142. The union table 142 may include the entries 225 from the table 210 and the entries 265 from the table 250. Headers 615 for the union table 142 may be based on the headers from the tables 210 and 250. Data may be reordered so that the data that was under semantically equivalent headers in the tables 210 and 250 is under the same one of the headers 615 in the union table 142. For example, the data for the "Grades" and "# of students" headers 255 from the table 250 has been reordered within the entries 265 to match the ordering of the headers 615 in the union table 142. All tables identified by, for example, the stitchable tables identifier 110, as being in a group of stitchable tables may be joined to form the union table 142. For example, if a third table was determined to be in a group of stitchable tables with the tables 210 and 250, the third table may be joined with the tables 210 and 250 to create the union table 142.

The hidden attributes, for example, those extracted by the hidden attribute extractor 120, may be added to the union table 142. Additional headers may be added to the headers 615 for the union table 142, and the values for the hidden attributes may then be stored under those headers in the entries for the tables that were joined to create the union table 142. For example, the headers 630 and 640 may be added to the union table 142 for the tables 210 and 250, and the values for the hidden attributes from the aligned segments 552 (or 560) and 559 (or 553 or 554) may be stored under the headers 630 and 640. Values from aligned segments may be added to the entries for the table extracted from the web page from which the value was extracted as contextual data. For example, the value "Arkansas" in the aligned segment 552 may have been extracted as part of the segment sequence 510 from the web page 310, as contextual data for the table 210 extracted from the table 315. "Arkansas" may be added to the entries 225 from the table 210 in the union table 142. The value "Massachusetts" from the aligned segment 552 may likewise be added to the entries 265 from the table 250 in the union table 142. This may allow the hidden attributes to provide further information and potentially disambiguate entries from multiple tables in the union table 142.

Headers for the hidden attributes may need to be labeled, for example, to provide context for the values stored under the headers in the union table 142. For example, the header 630 may be "State", and the header 640 may be "County." The labels for headers, such as the headers 630 and 640, may be determined by, for example, looking up the values of the hidden attributes in the class label database 143. The class label database 143 may store a number, for example, millions, of entities that are correlated with class labels for the entities. For example, the class label database 143 may include the names of the states in the United States, and each state name may be correlated with the class label "State." To determine the label for a header for a hidden attribute, the values for the hidden attribute may be looked up in the class label database 143 to determine if one class label applies to all of the values. For example, for the header 630, the values of the hidden attributes from the aligned segments 552, "Arkansas" and "Massachusetts", may be identified in the class label database 143. The class label database 143 may return a class label of "State" for both "Arkansas" and "Massachusetts." "State" may then be added to the union table 142 as the label for the header 630. If no one class label applies to all of the values for a hidden attribute, the class label that applies to most of the values may be used, or the hidden attribute may be discarded and not added to the union table 142.

Figure 7:
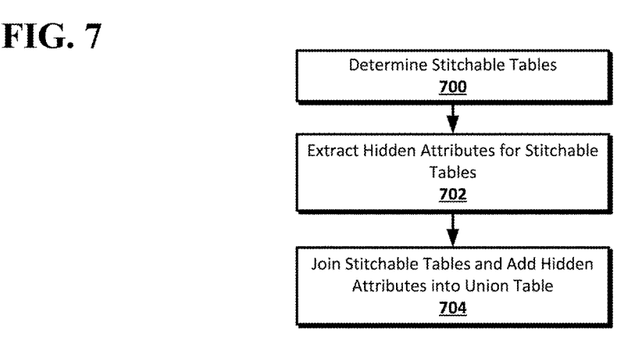
FIG. 7 shows an example process for generating a union table from stitchable tables according to an implementation of the disclosed subject matter

FIG. 7 shows an example process for generating a union table from stitchable tables according to an implementation of the disclosed subject matter. At 700, stitchable tables may be determined. For example, the stitchable tables identifier 110 may determine which tables from the extracted tables 141 are stitchable to one another, creating groups of stitchable tables, using for example, semantic equivalence and/or one-to-one correspondence between table headers. The tables 210 and 250 may be stitchable tables in one group of stitchable tables. The headers 215 of the table 210 and the headers 225 of the table 250 may be semantically equivalent and have a one-to-one correspondence.

At 702, hidden attributes may be extracted for the stitchable tables. For example, the hidden attribute extractor 120 may extract hidden attributes for the tables 210 and 250 in a group of stitchable tables from the web pages 310 and 350 from which the tables 210 and 250 were extracted into the extracted tables 141. The hidden attribute extractor 120 may use, for example, segmentation and alignment of text associated with the web pages 310 and 350, such as displayed text 325 and 365, to generate aligned segments such as the aligned segments 551, 552, 553, 554, 555, 556, 557, 558, 559 and 560. The text associated with the web pages 310 and 350 may be segmented into segment sequences 510 and 520 using any suitable heuristic. The segment sequences 510 and 520 may be aligned using, for example, pairwise, or iterative pairwise, alignment, generating aligned segments 551, 552, 553, 554, 555, 556, 557, 558, 559 and 560. The aligned segments 551, 552, 553, 554, 555, 556, 557, 558, 559 and 560 may then be filtered, removing aligned segments where the value for the segments is the same and the value is not found in a corpus of meaningful table headers, or where the segments are the null segment 440. Duplicate aligned segments may be consolidated. The remaining aligned segments 552 and 559 may include values for the hidden attributes.

At 704, the stitchable tables may be joined and the hidden attributes may be added into a union table. For example, the table stitcher 130 may receive the tables 210 and 250, which may be stitchable tables in a group of stitchable tables, from the stitchable tables identifier 110, and the hidden attributes for the tables 210 and 250 from the hidden attribute extractor 120. The table stitcher 130 may join the tables 210 and 250 into the union table 142, for example, unioning the data in the tables 210 and 250, creating the headers 615 from the headers 215 and 255, and reordering the data in the entries 225 and 265 as necessary to match the headers 615. Headers 630 and 640 for the hidden attributes, for example, from the aligned segments 552 and 554 may be added to the union table 142, and values for the hidden attributes may be added from the aligned segments 552 and 554 to the appropriate entries 225 and 265. Labels for the headers 630 and 640 may be determined by looking up the values from the aligned segments 552 and 559 for the hidden attributes in the class label database 143, and the labels may be added to the union table 142.

Figure 8:
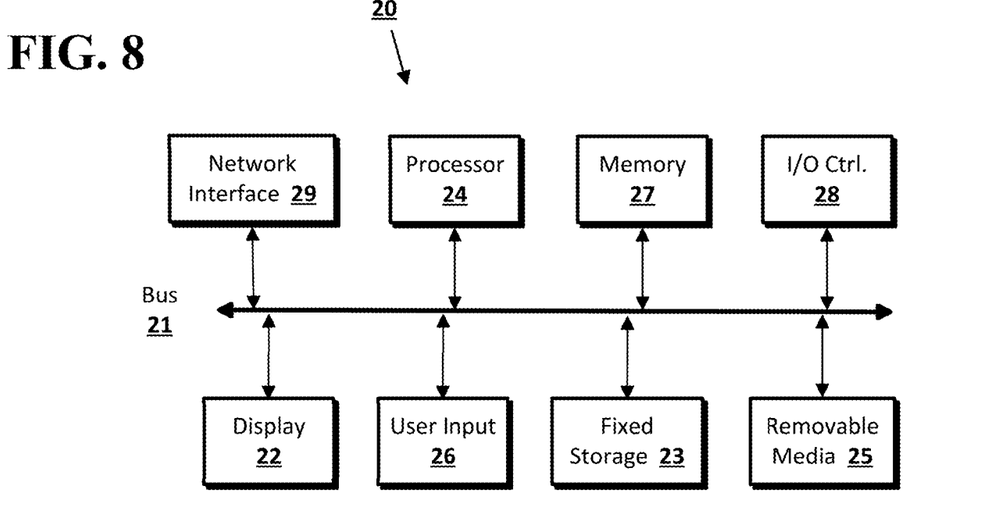
FIG. 8 shows a computer according to an embodiment of the disclosed subject matter.

Embodiments of the presently disclosed subject matter may be implemented in and used with a variety of component and network architectures. FIG. 8 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 9.

Many other devices or components (not shown) may be connected in a similar manner, such as document scanners, digital cameras, auxiliary, supplemental, or backup systems, or the like. Conversely, all of the components shown in FIG. 8 need not be present to practice the present disclosure. The components can be interconnected in different ways from that shown. The operation of a computer such as that shown in FIG. 8 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 9:
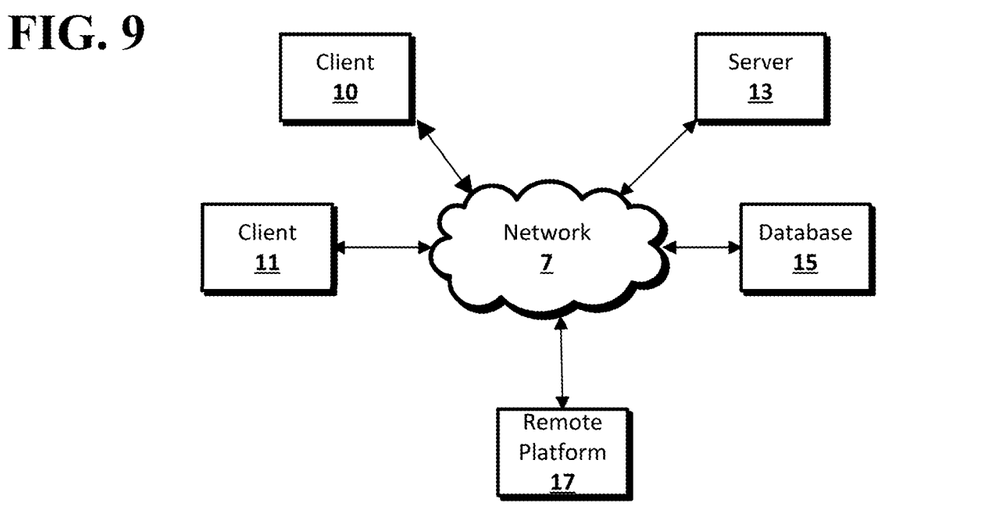
FIG. 9 shows a network configuration according to an embodiment of the disclosed subject matter.

FIG. 9 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed by a data processing apparatus, the method comprising:
   receiving two or more tables extracted from at least one or more web documents, and wherein each of the one or more web documents comprise one or more corresponding text portions that are separate from the two or more tables;
   comparing the headers of the two or more tables and determining that the headers of the two or more tables are semantically equivalent based on the comparison;
   determining, based on the headers of the two or more tables being determined as semantically equivalent, that the two or more tables include two or more stitchable tables;
   determining, for each of table of the two or more stitchable tables, the corresponding text portions of the one or more web documents from which the two or more stitchable tables are extracted;
   extracting, from the determined corresponding text portions, at least one hidden attribute that is related to content included in the two or more stitchable tables; and
   creating a union table by joining the two or more stitchable tables, wherein the union table comprises the two or more stitchable tables and the at least one hidden attribute in a new column within the union table.

2. The computer-implemented method of claim 1, wherein a second table of the two or more tables is semantically equivalent to exactly one corresponding header in the first table.

3. The computer-implemented method of claim 1, wherein determining that headers of the two or more tables are semantically equivalent comprises:
   determining a semantic equivalence between headers from a first of the two or more tables and headers from a second of the two or more tables.

4. The computer-implemented method of claim 3, wherein determining a semantic equivalence further comprises:
   determining that each of the headers from a first table of the two or more tables is semantically equivalent to exactly one corresponding header from the second table; and
   determining that each of the headers from the second table of the two or more tables is semantically equivalent to exactly one corresponding header in the first table.

5. The computer-implemented method of claim 4, wherein one of the headers from the first table is semantically equivalent to one of the headers from the second table when the header from the first table and the header from the second table are at least one of synonyms, acronyms, or semantic-preserving variations.

6. The computer-implemented method of claim 1, wherein the union table comprises at least one column that includes attribute values of the hidden attributes.

7. The computer-implemented method of claim 1, wherein extracting the hidden attributes comprises:

segmenting text associated with the at least one web document from which one of the stitchable tables was extracted to obtain at least two segment sequences, wherein the segment sequences comprise segments;

scoring possible segment alignments between the at least two segment sequences; and aligning segments between the at least two segment sequences based on the scoring of the possible segment alignments to obtain aligned segments.

8. The computer-implemented method of claim 7, wherein segmenting the text uses at least one heuristic to generate the segments, and wherein the at least one heuristic is selected from the group comprising: punctuation, html-tag separators, longest common subsequences, and a link between the text and an entity repository.

9. The computer-implemented method of claim 8, wherein scoring the possible segment alignments is based on the heuristic used to generate the segments.

10. The computer-implemented method of claim 7, further comprising:

discarding one of the aligned segments from the at least two segment sequences when the one of the aligned segments comprises segments with thea same value and the value is not found in a corpus of table headers that are identified as being meaningful table headers.

11. The computer-implemented method of claim 1, wherein joining the two or more stitchable tables further comprises:

determining a class label for the at least one hidden attribute; and adding the class label to the union table to label the at least one hidden attribute.

12. The computer-implemented method of claim 11, wherein determining the class label comprises determining an entity in a database that corresponds to a value type for the hidden attribute, wherein the class label for the hidden attribute is the class label associated with the entity in the database.

13. A computer-implemented method performed by a data processing apparatus, the method comprising:

extracting two or more tables from at least one or more web pages to obtain extracted tables, and wherein each of the one or more web pages comprise one or more corresponding text portions that are separate from the two or more extracted tables;

comparing the headers of the two or more extracted tables and determining that the headers of the two or more extracted tables are semantically equivalent based on the comparison;

determining, based on the headers of the two or more extracted tables being determined as semantically equivalent, that the two or more extracted tables include two or more stitchable tables;

determining, for each of table of the two or more stitchable tables, the corresponding text portions of the one or more web pages from which the two or more stitchable tables are extracted;

extracting, from the respective determined corresponding text portions, hidden attributes that are related to content included in the two or more stitchable tables; and creating a union table by joining the two or more stitchable tables, wherein the union table comprises data from the two or more stitchable tables and the hidden attributes extracted from the web pages from which the tables in the group of stitchable tables were extracted in a new column within the union table.

14. The computer-implemented method of claim 13, wherein at least two tables were extracted from the same web page.

15. The computer-implemented method of claim 13, wherein at least two tables were extracted from web pages on the same web site.

16. A computer-implemented system for stitching tables comprising:

a computer;

a non-transitory computer readable medium in data communication with the computer and storing instructions executable by the computer and that define:

a stitchable table identifier within the computer and adapted to receive extracted tables from one or more web pages, wherein each of the one or more web pages comprise one or more corresponding text portions that are separate from the two or more tables, and compare the headers of the two or more tables and determine semantic equivalence of headers based on the comparison, and determine the extracted tables to be stitchable tables based on the headers of the two or more tables being determined as semantically equivalent;

a hidden attribute extractor within the computer and adapted to receive the two or more stitchable tables and determine, for each of the stitchable tables, the corresponding text portions of the one or more web pages from which the stitchable tables are extracted, and extract, from the determined corresponding text portions, hidden attributes that are related to content included in the two or more stitchable tables; and a table stitcher within the computer and adapted to create a union table by joining the stitchable tables, and add the hidden attributes to the union table in one or more new columns within the union table; and a non-transitory storage adapted to store the extracted tables and the union table.

17. The computer-implemented system of claim 16, wherein the storage is further adapted to store a class label database comprising entities associated with class labels, and wherein the table stitcher is further adapted to add a header for the hidden attributes to the union table using the class label database.

18. The computer-implemented system of claim 16, wherein the hidden attribute extractor is further adapted to extract hidden attributes using segmentation of text associated with the web pages, and using iterative pairwise alignment.

19. The computer-implemented system of claim 18, wherein the hidden attribute extractor is further adapted to segment the text associated with the web pages using at least one heuristic.

20. A system comprising: one or more computers, each of the one or more computers having one or more processors, and one or more storage devices storing instructions which are operable, when executed by the one or more computers, to cause the one or more processors of the one or more computers to perform operations comprising:

receiving two or more tables extracted from at least one or more web documents, and wherein each of the one or more web documents comprise one or more corresponding text portions that are separate from the two or more tables;

comparing the headers of the two or more tables and determining that the headers of the two or more tables are semantically equivalent based on the comparison;

determining, based on the headers of the two or more tables being determined as semantically equivalent, that the two or more tables include two or more stitchable tables;

determining, for each of table of the two or more stitchable tables, the corresponding text portions of the one or more web documents from which the two or more stitchable tables are extracted;

extracting, from the determined corresponding text portions, at least one hidden attribute that is related to content included in the two or more stitchable tables; and creating a union table by joining the two or more stitchable tables, wherein the union table comprises the two or more stitchable tables and the at least one hidden attribute in a new column within the union table.

* * * * *

UNITED STATES PATENT AND TRADEMARK OFFICE
CERTIFICATE OF CORRECTION

PATENT NO.        : 9,720,896 B1                                              Page 1 of 1
APPLICATION NO.   : 14/143032
DATED             : August 1, 2017
INVENTOR(S)       : Wu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 583 days.

Signed and Sealed this
Twenty-fifth Day of September, 2018

Andrei Iancu
*Director of the United States Patent and Trademark Office*